US006655896B2

(12) United States Patent
Morin et al.

(10) Patent No.: US 6,655,896 B2
(45) Date of Patent: Dec. 2, 2003

(54) VEHICLE WITH FULL SIZE SPARE TIRE CONVERSION AND LIFTING MECHANISM

(75) Inventors: Robert L. Morin, Glen Allen, VA (US); Rick Gullette, Lima, OH (US); Dean Long, Harrod, OH (US)

(73) Assignee: Accubuilt, Inc., Lima, OH (US)

( * ) Notice: Subject to any disclaimer, the term of this patent is extended or adjusted under 35 U.S.C. 154(b) by 0 days.

(21) Appl. No.: 09/772,897

(22) Filed: Jan. 31, 2001

(65) Prior Publication Data

US 2001/0041126 A1 Nov. 15, 2001

Related U.S. Application Data

(62) Division of application No. 09/429,914, filed on Oct. 29, 1999, now abandoned.

(51) Int. Cl.[7] ............................................. B60R 11/00
(52) U.S. Cl. ...................................... 414/463; 296/37.2
(58) Field of Search ...................... 29/401.1; 224/42.21; 296/37.2, 37.14; 414/426, 463, 466, 471, 495, 465

(56) References Cited

U.S. PATENT DOCUMENTS

| | | | |
|---|---|---|---|
| 2,641,500 A | 6/1953 | Walker | |
| 3,712,586 A | 1/1973 | Nicholson ............ 224/42.21 X | |
| 3,730,481 A | 5/1973 | Ekonen et al. | |
| 3,869,075 A | 3/1975 | Kissner ................... 224/42.06 |
| 3,940,041 A | 2/1976 | Bott ......................... 224/42.12 |
| 4,106,681 A | 8/1978 | Bott ......................... 224/42.12 |
| 4,398,765 A | 8/1983 | Ishikawa | |
| 4,423,900 A | 1/1984 | Sugimoto et al. ......... 296/37.14 |
| 4,632,288 A | 12/1986 | Bullock .................... 224/42.12 |
| 4,801,169 A | * | 1/1989 | Queen et al. .............. 296/39.1 |
| 5,823,408 A | 10/1998 | Kim ......................... 224/42.21 |
| 5,860,687 A | * | 1/1999 | Corporon et al. .......... 296/37.2 |
| 5,951,232 A | 9/1999 | Yu et al. ...................... 414/463 |
| 6,033,003 A | * | 3/2000 | Bell et al. .................. 296/37.3 |
| 6,290,278 B1 | * | 9/2001 | Loveland .................... 296/39.1 |

FOREIGN PATENT DOCUMENTS

DE        2 238 933        2/1974

* cited by examiner

Primary Examiner—Janice L. Krizek
(74) Attorney, Agent, or Firm—Troxell Law Office PLLC (57) ABSTRACT

A vehicle is disclosed which is normally supported by a plurality of wheels and tires, the vehicle having an article carrying space, with a floor formed of a first material and having an opening. A spare wheel and tire storage well is mounted in the opening through the floor and is formed of a second material different from the first material. The storage well is configured to accommodate a spare wheel and tire substantially equal in width and diameter to at least one of the plurality of wheels and tires supporting the vehicle. Also disclosed is a method for modifying a vehicle to carry a full size spare wheel and tire, including removing a portion of the floor of the vehicle, which portion includes a first storage well, to form an opening in the floor, placing a second storage well in the opening in the floor, the second storage well being configured and to accommodate a full size spare wheel and tire having a maximum width and diameter substantially equal to at least one of the wheels and tires normally supporting the vehicle such that a major portion of a maximum width of the full size spare wheel and tire is located below an upper surface of the floor, and attaching the second storage well to the floor. A lifting mechanism is disclosed to assist in the removal of the spare wheel and tire from the storage well. A force generating mechanism raises the spare wheel and tire when a securing device is removed.

20 Claims, 7 Drawing Sheets

VEHICLE WITH FULL SIZE SPARE TIRE CONVERSION AND LIFTING MECHANISM

The present invention is a Divisional of U.S. patent application Ser. No. 09/429,914, filed Oct. 29, 1999, now abandoned.

BACKGROUND OF THE INVENTION

The present invention relates to a vehicle having an article carrying space, such as a trunk, which is converted to carry a full size spare tire and a method for carrying out such conversion. The invention also relates to a lifting mechanism to raise the full size spare tire from its storage position to assist in the removal of the full size spare tire from the vehicle.

Temporary or space saver spare tires have achieved great popularity within the last few years. Typically such tires comprise a wheel having a lug pattern to fit the lug pattern of the wheels normally supporting the vehicle, the wheel having a smaller diameter than the normal vehicle wheels and a high pressure tire, also having a smaller outer diameter than those of the normal vehicle tires. By reducing the diameter of the wheel and the tire, a manufacturer is able to reduce the amount of storage space that is required for carrying the temporary spare tire. By minimizing the storage volume necessary for the temporary spare tire, the manufacturer may maximize the article carrying capacity of the vehicle. In a sedan-type vehicle, the temporary spare tire is normally stored in a storage well formed in a floor of the trunk of the vehicle. The reduced dimensions of the temporary spare tire enable the spare tire to be stored and covered and not protrude into the article carrying space.

Although such temporary or space saver spare tires have achieved great popularity, they are not without their drawbacks. Such spare tires have limited mileage in which they may be used and many have limitations regarding the speed the vehicle may be driven while such temporary spare tires are in use. In addition the mileage and speed limitations, the smaller diameter of the tire associated with the temporary spare drastically alters the attitude of the vehicle when the temporary spare is in use, creating discomfort to the passengers of the vehicle and possibly causing handling difficulties.

While these difficulties may be acceptable in vehicles utilized for personal transportation, they are not acceptable for commercial vehicles, such as limousines and taxicabs. Commercial vehicle users require that their passengers be transported as quickly as possible and with no discomfort. The use of a temporary or space saver spare on such a commercial vehicle would limit the speed and the distance the vehicle could be driven, and would provide discomfort to the passengers. In addition, many jurisdictions require commercially registered vehicles to carry a full size spare tire, i.e., a tire having the same dimensions as the tires normally utilized on the vehicle.

The storage well formed in the floor of the article carrying space of the vehicle is sized to accept only a temporary, or space saver spare tire. Thus, it is impossible due to the reduced diameter and depth of such a storage well, to place a full size spare tire in the storage well. It is, of course, possible to merely place the full size spare tire in the article carrying space of the vehicle. However, this seriously reduces the ability of the commercial vehicles to carry packages, luggage, etc., for their passengers. Due to the severe limitation of article carrying space, placing the full size spare in the article carrying space is not a viable option.

Thus, there is believed to be a need for a vehicle, when it is converted into a commercial vehicle, such as a limousine, taxicab, etc., to accommodate a full size spare wheel and tire with at least a majority of the maximum width of the spare tire located below the level of the floor of the article carrying space. This would not only enable the vehicle to carry such a full size spare, but would minimize the intrusion of the full size spare tire in the article carrying space.

Quite obviously, a full size spare tire is heavier and more difficult to remove from the article carrying space, or to place into the article carrying space. Therefore, there is also believed to be a need for a full sized spare tire lifting assist mechanism to assist the user in removing and replacing the full size spare tire.

SUMMARY OF THE INVENTION

A vehicle is disclosed which is normally supported by a plurality of wheels and tires, the vehicle having a body bounding an article carrying space, such as a trunk, with a floor located in the article carrying space, the floor being formed of a first material and having an opening therethrough. The vehicle also has a spare wheel and tire storage well mounted in the opening through the floor and being formed of a second material different from the first material, the storage well configured so as to accommodate a spare wheel and tire such that a major portion of a maximum width of the spare wheel and tire is located below the surface of the floor, the spare wheel and tire being substantially equal in width and diameter to at least one of the plurality of wheels and tires supporting the vehicle.

Also disclosed is a method for modifying a vehicle to carry a full size spare wheel and tire. The vehicle normally has an article carrying space including a floor with a first storage well for carrying a temporary spare wheel and tire. The method includes removing a portion of the floor of the vehicle, which portion includes the first storage well, to form an opening in the floor, placing a second storage well in the opening in the floor, the second storage well being configured and to accommodate a full size spare wheel and tire having a maximum width and diameter substantially equal to at last one of the wheels and tires normally supporting the vehicle such that a major portion of a maximum width of the full size spare wheel and tire is located below an upper surface of the floor, and attaching the second storage well to the floor.

Typically, the floor of the article carrying space comprises a metallic material, such as sheet metal. The storage well accommodating the full size spare tire is formed of a different material, such as a fiber reinforced plastic material. A flange extending outwardly from the full size spare tire storage well is attached to the floor of the article carrying space. The flange may be attached to an upper surface of the floor, or a lower surface of the floor, by bonding, the use of mechanical fasteners, or any other known techniques. According to this invention, approximately 85% of the maximum width of the full size spare tire is located below the upper surface of the floor to minimize the reduction in article storage space.

The present invention also encompasses a vehicle having a body bounding an article carrying space including a floor with a spare wheel and tire storage well incorporating a lifting device for lifting a spare wheel and tire from a stored position within the storage well, in which position a major portion of a maximum width of the spare wheel and tire is located below an upper surface of the floor, to a use position in which at least a major portion of the maximum width of the spare wheel and tire is located above the upper surface of the floor.

DETAILED DESCRIPTION OF THE PREFERRED EMBODIMENTS

Figure 1:
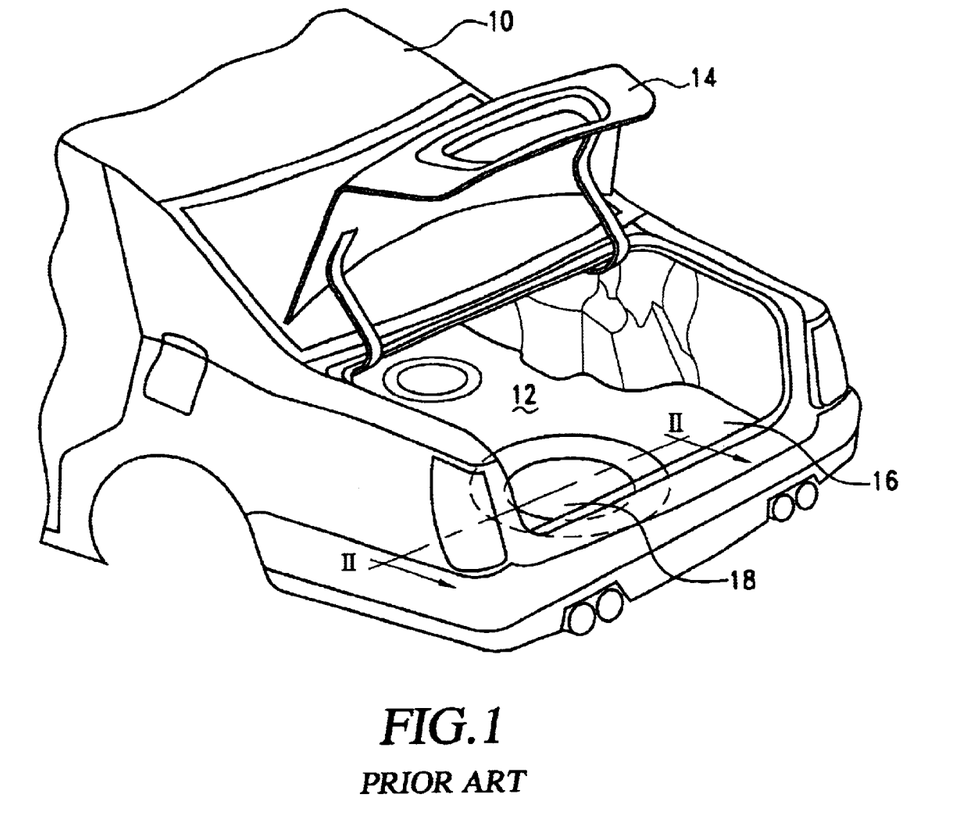
FIG. 1 is a partial, perspective view of a sedan-type vehicle illustrating a known temporary spare wheel and tire storage well in the trunk.

A known vehicle is illustrated in FIG. 1 having a vehicle body 10 bounding an article carrying space 12, in this particular instance a trunk. Although the invention will be described in conjunction with a sedan-type vehicle having a trunk, it is to be understood that the principles elucidated herein are also applicable to a station wagon type vehicle having an elongated article carrying space which communicates with the passenger carrying space. Typically, the vehicle body 10 includes a trunk lid 14, illustrated in an open position, but which is closable to enclose the article carrying space 12.

The article carrying space 12 has a floor 16 with a storage well 18 formed therein to accommodate a temporary, or space saving spare wheel and tire. The terminology "temporary" or "space saving" spare wheel and tire is to be understood to mean a spare wheel and tire having a smaller diameter and smaller maximum width than the corresponding dimensions of the wheels and tires normally supporting the vehicle.

Figure 2:
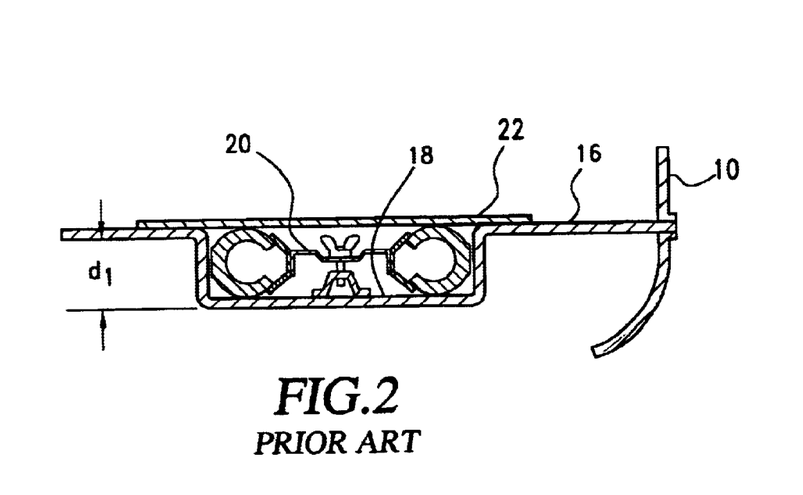
FIG. 2 is a partial, cross-sectional view taken along line II—II in FIG. 1.

As illustrated in FIG. 2, the temporary spare wheel and tire storage well 18 has a diameter sufficient to accommodate the outer diameter of the temporary spare wheel and tire 20, and a depth $d_1$ sufficient to locate the maximum width of the spare wheel and tire 20 equal to or slightly below an upper surface of floor 16. A cover 22 may be placed over the temporary spare tire and wheel storage well 18 as is well known in the art.

Figure 3:
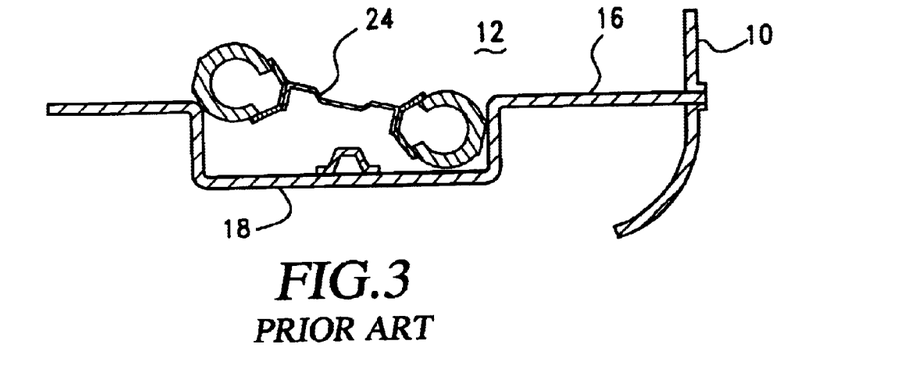
FIG. 3 is a cross-sectional view, similar to FIG. 2, illustrating a full size spare wheel and tire being stored in the storage well of FIGS. 1 and 2.

As discussed previously, it is highly desirable for a commercial vehicle, such as a limousine, taxicab, etc., to carry a full size spare wheel and tire. The term "full size" is to be understood to mean a spare wheel and tire having a diameter and maximum width substantially the same as at least one of the wheels and tires normally supporting the vehicle. However, when a vehicle is converted from a personal use type vehicle to a commercial vehicle, the article carrying space has a spare wheel and tire storage well that is sized to accommodate only a temporary or space saving spare wheel and tire. If a full size spare wheel and tire is placed into the storage well sized to accommodate a temporary spare wheel and tire, the full size spare wheel and tire 24 will protrude into the article carrying space, as illustrated in FIG. 3, thereby significantly reducing the article carrying space.

Figure 4:
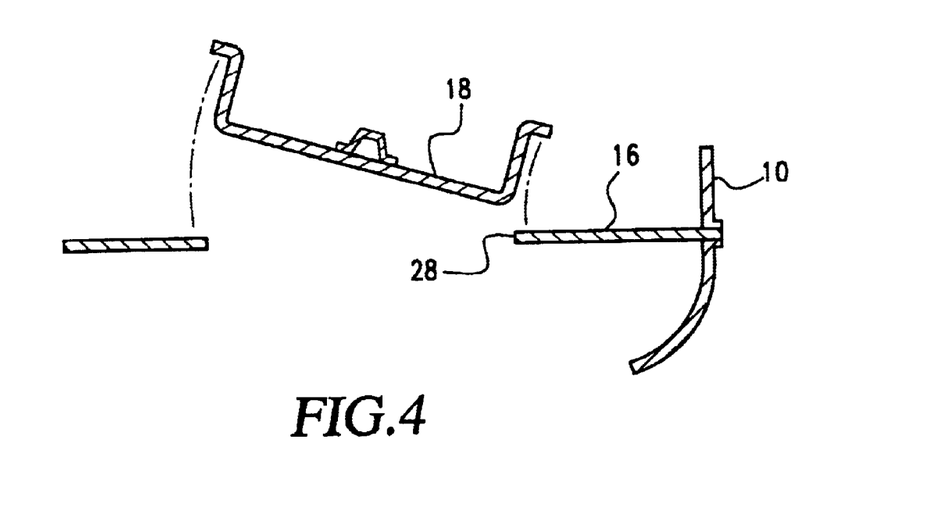
FIG. 4 is a cross-sectional view illustrating the removal of the temporary spare wheel and tire storage well, according to the present invention.
Figure 5:
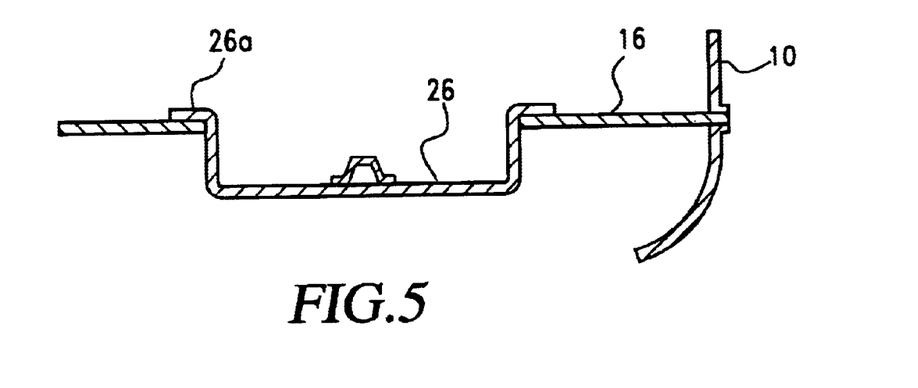
FIG. 5 is a cross-sectional view, similar to FIG. 4, illustrating the installation of a storage well configured to accept a full size spare wheel and tire.
Figure 8:
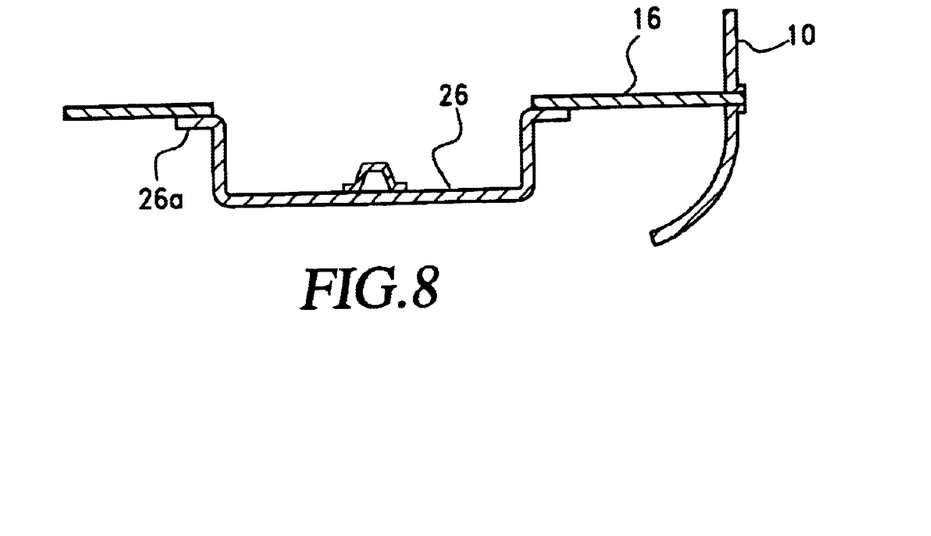
FIG. 8 is a cross-sectional view, similar to FIG. 5, illustrating the full size storage well attached to a bottom surface of the trunk floor.
Figure 9:
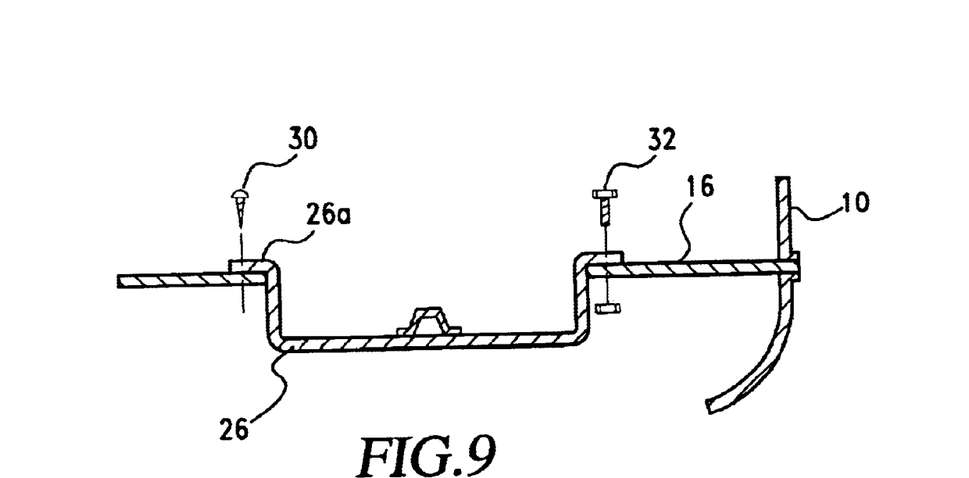
FIG. 9 is a cross-sectional view, similar to FIG. 5, illustrating another alternative embodiment in which the full size spare wheel and tire storage well is attached to the trunk floor by mechanical fasteners.

In order to solve this problem, the present invention provides a method for converting the storage well into one which will accommodate a full size spare wheel and tire. The conversion method encompasses the step of removing the storage well 18, which is configured to accept only a temporary wheel and tire from the floor 16, as illustrated in FIG. 4, which creates an opening 28 through the floor 16. The size of opening 28 is sufficient to accommodate a new spare tire storage well 26 which is configured to accept a full size spare wheel and tire therein. The full size spare wheel and tire storage well 26 is then attached to the floor 16. Storage well 26 may have an outwardly extending flange 26a extending from opposite sides, or extending around the upper periphery of the storage well 26. Flange 26a may be attached to an upper surface of the floor 16, as illustrated in FIG. 5, or may be attached to a lower surface of the floor 16, as illustrated in FIG. 8. In either case, the storage well 26 is made of a material different from that of the floor 16, such as a fiber reinforced plastic, fiberglass or other composite material. The flange 26a may be attached to the floor 16 by utilizing known bonding materials to bond the flange 26a to either the upper surface or the lower surface of floor 16. One or more mechanical fasteners, such as threaded screws 30 or bolts 32 may be utilized in conjunction with the bonding material, or may be utilized alone to attach the flange 26a to the floor 16, as illustrated in FIG. 9. Although FIG. 9 illustrates the flange 26a attached to the upper surface of floor 16, it is to be understood that mechanical fasteners may also be utilized with the orientation illustrated in FIG. 8 wherein the flange 26a is attached to a lower surface of the floor 16.

Figure 6:
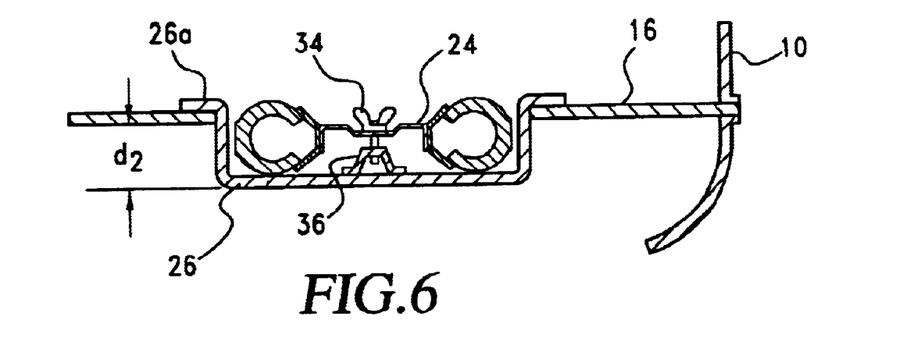
FIG. 6 is a cross-sectional view, similar to FIG. 5, illustrating the full size spare wheel and tire located within the storage well of FIG. 5.

FIG. 6 is a cross-sectional view similar to FIG. 2, illustrating the full size spare wheel and tire 24 placed in the storage well 26. The depth $d_2$ of the storage well 26 is greater than depth $d_1$ and is sufficient to accommodate a major portion of the maximum width of the spare wheel and tire 24 below an upper surface of the floor 16, and is preferably of sufficient depth to accommodate at least 85% of the maximum width of the full size spare wheel and tire 24 below the upper surface of the floor 16. In known fashion, the full size spare wheel and tire 24 may be retained in place by threaded wing nut 34 engaging fixed nut 36. If desired, a cover similar to cover 22 may be placed across the upper opening of the storage well 26 so as to cover the full size spare wheel and tire 24.

Figure 7:
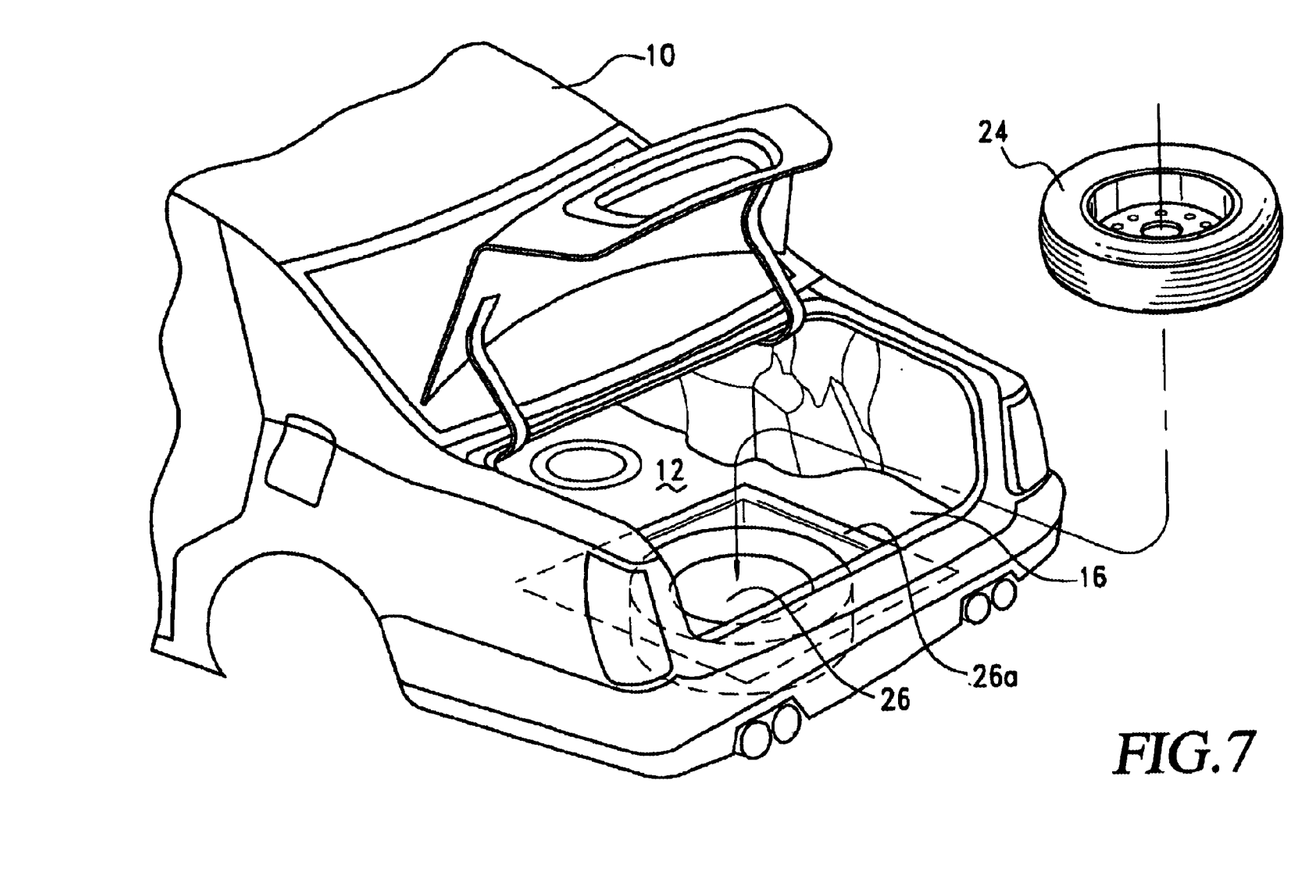
FIG. 7 is a partial, perspective view of a sedan-type vehicle having the storage well according to the present invention installed in a trunk floor.

FIG. 7 illustrates the vehicle 10 after undergoing the conversion according to this invention. As can be seen, the storage well 26 can accommodate a full size spare wheel and tire 24 without significant intrusion into the article storage space 12.

A full size spare wheel and tire is, of course, heavier than a temporary spare wheel and tire, and occupies a greater volume, thereby increasing the difficulty in removing the full size spare wheel and tire from the storage well 26, or placing the spare wheel and tire in the storage well. To circumvent these potential difficulties, the present invention also encompasses a spare wheel and tire lifting mechanism to raise the full size spare wheel and tire upwardly from the storage well 26 to a position where it may be more easily manipulated by a user. The present invention also encompasses such a lifting mechanism which may be associated with any type of spare wheel and tire storage well in order to raise the spare tire from a storage position within the storage well.

Figure 10:
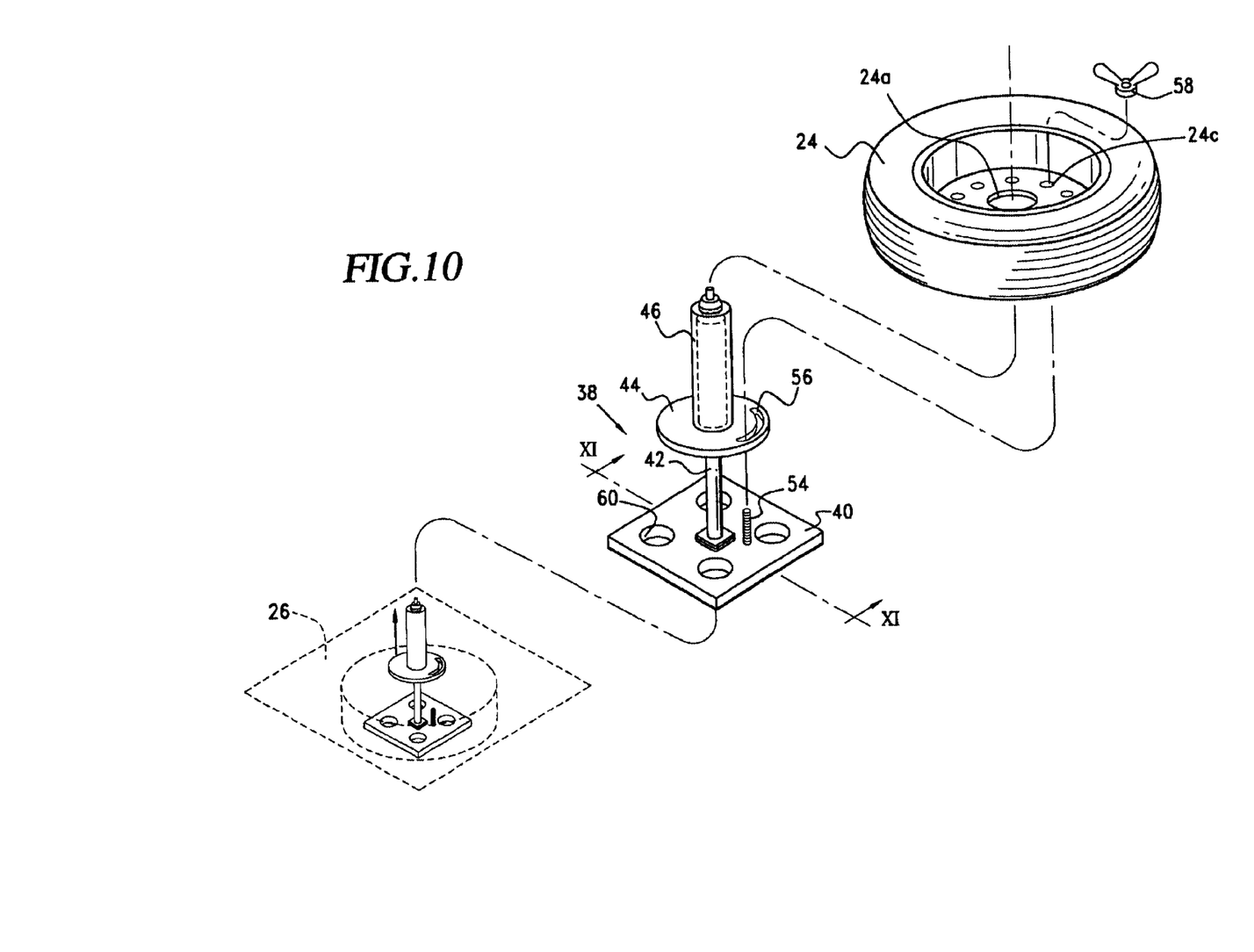
FIG. 10 is an exploded schematic view illustrating the spare wheel and tire lifting mechanism according to the present invention.
Figure 11:
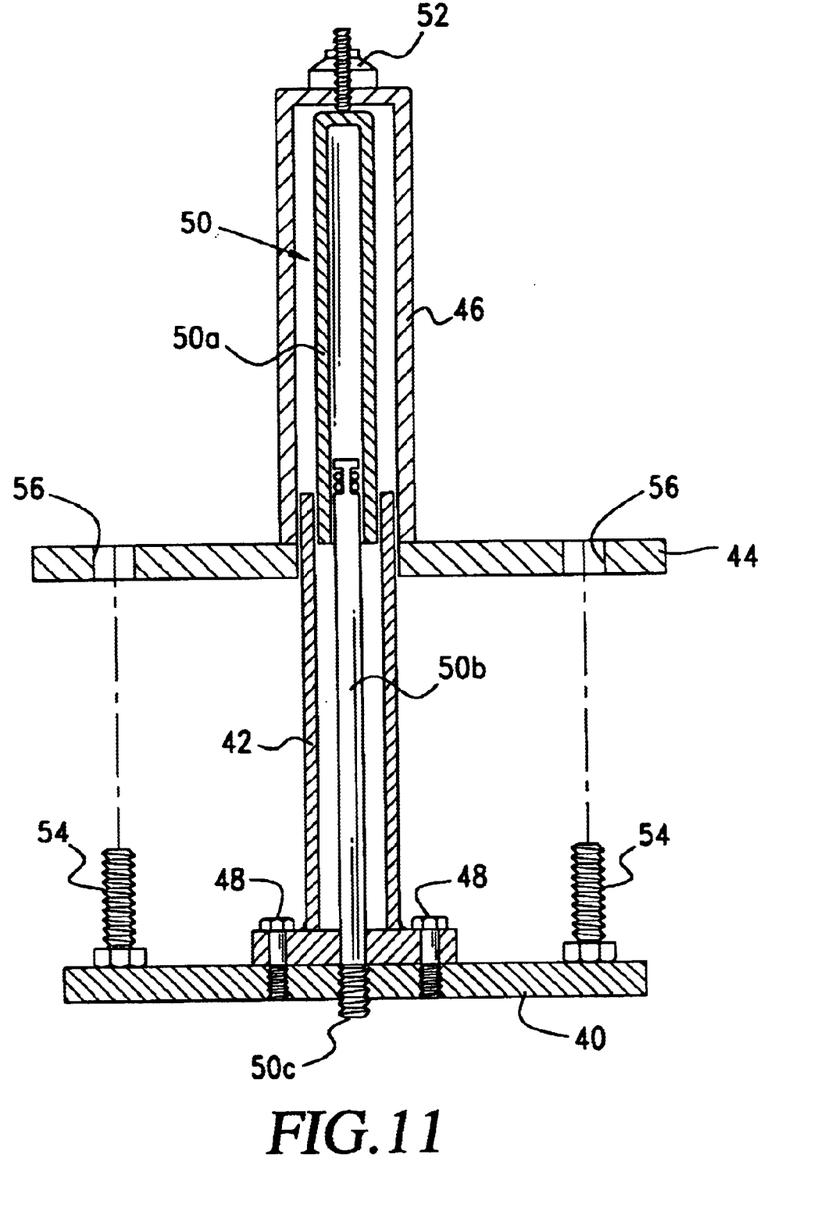
FIG. 11 is a cross-sectional view taken along line XI—XI in FIG. 10.

As best seen in FIG. 10, the spare wheel and tire lifting mechanism 38 comprises a force generating mechanism having a first portion, consisting of a base member 40 and a sleeve member 42 fixedly attached to and extending upwardly from the base member 40, and a second portion having a wheel support member 44 with a generally cylindrical wheel locating member 46 fixedly connected to, and extending upwardly from the wheel support member 44. As can be seen in FIG. 11, the wheel locating member 46 and the sleeve member 42 may comprise hollow cylindrical members and are sized such that the sleeve member 42 may be slidably received within the interior of the wheel locating member 46. The exterior dimensions of the wheel locating member 46 are such that it may be received in a central opening 24a which exists through the center of the wheel of the full size spare wheel and tire 24. A lower end of the sleeve member 42 is fixedly attached to the base member 40 by any known method, such as by bolts 48.

A force generating mechanism, such as a known type of pressurized gas spring 50 is located within the hollow interiors of the wheel locating member 46 and the sleeve member 42. As is well known in the art, such gas spring assemblies 50 comprise a cylinder portion 50a containing a pressurized gas, and a piston rod 50b that is movably received within the cylinder 50a and has an internal piston on which the pressurized gas acts so as to normally bias the piston rod 50b to an extended position, as illustrated in FIG. 11. A compression coil spring may be located in cylinder portion 50a to assist the pressurized gas, or the coil spring may supply 100% of the biasing force. In such instance, the coil spring will act between the piston rod 50b and the closed end of the cylinder portion 50a. An upper end of the cylinder portion 50a is fixedly attached to an end of the wheel locating member 46, such as by fastener 52. Fastener 52 attaches these elements together such that there is no relative motion between them. A distal end of the piston rod 50 is fixedly attached to the base member 40 such as by a threaded end portion 50c of the piston rod 50b which may be threaded into the base member 40. Again, such connection prevents any relative movement between the piston rod 50b and the assembly comprising the base plate 40 and the sleeve member 42.

Force generating member 50 typically has a stopping mechanism which limits the extension of the piston rod 50b from the cylinder 50a. In this maximum extended position, as illustrated in FIG. 11, the upper end of the sleeve member 42 is received within the interior of the wheel locating member 46. The upward force generated by the force generating mechanism 50 should be sufficient to hold the weight of the spare wheel and tire on the wheel support member 44 without noticeably retracting the piston rod 50b within the cylinder 50a. However, such force should allow a user to force the cylinder 50a, along with the wheel locating member 46 and wheel support member 44 downwardly by exerting a slight force on the full size spare wheel and tire 24. Once the spare wheel and tire 24 has reached its storage position, securing lugs 54 pass through slots 56 formed in the wheel support member 44 and engage an existing lug opening 24b in the wheel of the spare wheel and tire 24. Although a single securing lug 54 is illustrated in FIG. 10, it is to be understood that a plurality of such lugs may be utilized, as illustrated in FIG. 11. The securing lugs are positioned so that they may engage one or more of the existing holes in the wheel of the spare wheel and tie 24.

Once the spare wheel and tire 24 as in the storage position, it may be held in this position by attaching a wing nut or the like 58 to the securing lugs 54.

In order to remove the full size spare wheel and tire 24 from its storage position within the storage well 26, it is merely necessary to undue the wing nuts 48 from the securing lugs 54 to allow the force generating mechanism 50 to raise the spare wheel and tire 24 from the storage position to a position in which it is located above the storage well to thereby facilitate its removal. In order to facilitate the positioning of the spare wheel and tire 24 so as to engage the one or more securing lugs 54, slots 56 formed in the wheel support member 44 may be arcuate in configuration, as illustrated in FIG. 10. This will enable the spare wheel and tire 24, as well as the wheel support member 44 to be readily manipulated to align the securing lugs 54 with an existing opening in the wheel of the spare wheel and tire 24.

Base member 40 may be fixedly attached to a bottom wall of the storage well 26 by known mechanical fasteners, or may be fixedly attached to the wall during the forming of the storage well 26 from composite materials such as by molding. The base member 40 may be integrally molded in the bottom wall, if desired.

The base member 40 may have attachment openings 60 formed therein to facilitate the attachment of the base member 40 to the bottom wall of the storage well. Quite obviously, the base member 40 may be attached to a bottom wall of an existing spare wheel and tire storage well to facilitate the removal and placement of the spare wheel and tire into or from the storage well.

The foregoing description is provided for illustrative purposes only and should not be construed as in any way limiting this invention, the scope of which is defined solely by the appended claims.

What is claimed is:

1. A vehicle supported by a plurality of wheels and tires, and having a body bounding an article carrying space, the vehicle comprising:
   a) a floor located in the article carrying space, the floor being formed of a first material and having an opening therethrough; and
   b) a spare wheel and tire storage well mounted in the opening through the floor and being formed of a second material, different from the first material, the storage well configured so as to accommodate a spare wheel and tire therein such that a major portion of a maximum width of the spare wheel and tire is located below the floor, the spare wheel and tire being substantially equal in width and diameter to at least one of the plurality of wheels and tires supporting the vehicle.

2. The vehicle of claim 1 wherein approximately 85% of the maximum width of the spare wheel and tire is located below an upper surface of the floor.

3. The vehicle of claim 1 wherein the first material is a metallic material and the second material is a non-metallic material.

4. The vehicle of claim 3 wherein the non-metallic material comprises a fiber reinforced plastic material.

5. The vehicle of claim 1 wherein the storage well further comprises an outwardly extending flange connected to the floor.

6. The vehicle of claim 5 further comprising a bonding material bonding the flange of the storage well to the floor.

7. The vehicle of claim 5 wherein the flange is attached to an upper surface of the floor.

8. The vehicle of claim 5 wherein the flange is attached to a lower surface of a floor.

9. The vehicle of claim 5 further comprising at least one mechanical fastener attaching the flange to the floor.

10. The vehicle of claim 9 wherein the at least one mechanical fastener comprises at least one threaded fastener.

11. A vehicle supported by a plurality of wheels and tires, and having a body bounding an article carrying space, the vehicle comprising:
   a) a floor located in the article carrying space, the floor being formed of a first material and having an opening therethrough;
   b) a spare wheel and tire storage well mounted in the opening through the floor and being formed of a second material, different from the first material, the storage well configured so as to accommodate a spare wheel and tire therein such that a major portion of a maximum width of the spare wheel and tire is located below the floor, the spare wheel and tire being substantially equal in width and diameter to at least one of the plurality of wheels and tires supporting the vehicle; and
   c) a lifting device mounted in the spare wheel and tire storage well for lifting the spare wheel and tire from a storage position in which the major portion of the maximum width of the spare wheel and tire is located below an upper surface of the floor, to a use position in which at least the major portion of the maximum width of the spare wheel and tire is located above the upper surface of the floor.

12. The vehicle of claim 11 wherein the spare wheel and tire storage well has a bottom wall and wherein the lifting device is mounted on the bottom wall.

13. The vehicle of claim 11 wherein the lifting device comprises a force generating mechanism having first and second portions relatively movable with respect to each other, the first portion acting on the spare wheel and tire storage well and the second portion acting on the spare wheel and tire, wherein the force generating mechanism generates a lifting force sufficient to raise the spare wheel and tire to the use position.

14. The vehicle of claim 13 wherein the force generating mechanism comprises a pressurized gas spring.

15. The vehicle of claim 13 wherein the second portion comprises a wheel support member having a wheel locating member extending therefrom, the wheel locating member configured to extend through an existing hole in a wheel of the spare wheel and tire.

16. The vehicle of claim 15 wherein the first portion comprises:
   a) a base member, and
   b) a rod member extending from the base member and movably connected to the second portion.

17. The vehicle of claim 16 further comprising a securing mechanism to secure the spare wheel and tire to the base member thereby holding the spare wheel and tire in the storage position against a force of the force generating mechanism.

18. The vehicle of claim 17 wherein the securing mechanism comprises a securing member extending from the base member and located so as to extend through an existing hole in a wheel of the spare wheel and tire, and a locking device engaged with the securing member.

19. The vehicle of claim 18 wherein the securing member is threaded and the locking device comprises a nut threaded onto the securing member.

20. The vehicle of claim 18 further comprising a slot in the wheel support member located such that the securing member extends through the slot.

* * * * *